(12) United States Patent
Tovino et al.

(10) Patent No.: US 8,948,359 B1
(45) Date of Patent: *Feb. 3, 2015

(54) EXTENSION MONITORING IN A DISTRIBUTED TELEPHONY SYSTEM

(71) Applicant: ShoreTel, Inc., Sunnyvale, CA (US)

(72) Inventors: Michael S. W. Tovino, Sandy, OR (US); Richard A. Winslow, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,137

(22) Filed: Jun. 28, 2013

Related U.S. Application Data

(63) Continuation of application No. 10/932,614, filed on Sep. 1, 2004, now Pat. No. 8,503,640.

(51) Int. Cl.
*H04M 3/42* (2006.01)
*H04M 9/00* (2006.01)

(52) U.S. Cl.
CPC .................................. *H04M 9/005* (2013.01)
USPC ............ 379/201.01; 379/211.01; 379/211.02; 379/212.01; 379/214.01; 379/215.01

(58) Field of Classification Search
CPC ........... H04M 3/08; H04M 3/22; H04M 3/36; H04M 3/253; H04M 3/2535; H04M 3/42212; H04M 3/428; H04M 3/51; H04M 3/5108; H04M 3/54; H04M 3/546; H04M 3/57; H04M 3/575; H04M 3/578; H04M 3/663; H04M 2201/38; H04M 19/04; H04Q 3/625
USPC ........ 379/88.11, 88.17, 93.17, 93.35, 142.17, 379/201.04, 211.02, 212.01, 214.01, 379/215.01, 376.01, 32.01, 32.04
See application file for complete search history.

(56) References Cited

U.S. PATENT DOCUMENTS

| | | | |
|---|---|---|---|
| 3,904,830 | A | 9/1975 | Every, Sr. et al. |
| 4,150,257 | A | 4/1979 | Fenton et al. |
| 4,296,282 | A | 10/1981 | O'Neil et al. |
| 4,436,962 | A | 3/1984 | Davis et al. |
| 4,436,963 | A | 3/1984 | Cottrell et al. |

(Continued)

OTHER PUBLICATIONS

Avaya, Inc., Support: What is Bridged Access in the System 25?, 2004 [Retrieved Jan. 6, 2005], Retrieved from the Internet, http://support.avaya.com/japple/css/japple?temp.groupID=107529& temp.selectedFamily=107576&temp.selectedProduct=107601& temp.selectedBucket=108020&temp. feedbackState=askForFeedback&temp.documentID=108893& temp.selectedRelease=129571&PAGE=avaya.css.CSSLvl1Detail& executeTransaction=avaya.css.UsageUpdate( ), 3 pgs.

(Continued)

*Primary Examiner* — Khai N Nguyen
(74) *Attorney, Agent, or Firm* — Patent Law Works LLP

(57) ABSTRACT

A telephony system is presented that enables one user to monitor another user's extension and perform functions on calls destined for the other user's extension. The system includes a server with a telephony management software (TMS) unit, a telephony application programming interface (TAPI) unit, and an application unit. The application unit includes a control module, association module, presentation module, park module, monitoring device interface module, and storage interface module. A server sends information to a monitoring device regarding the status of a monitored extension and calls offering on that extension. A server also enables a user to navigate through multiple calls offering and park a selected call.

30 Claims, 11 Drawing Sheets

(56) References Cited

U.S. PATENT DOCUMENTS

| | | | |
|---|---|---|---|
| 4,476,349 | A | 10/1984 | Cottrell et al. |
| 4,866,758 | A | 9/1989 | Heinzelmann |
| 5,263,084 | A | 11/1993 | Chaput et al. |
| 5,276,731 | A * | 1/1994 | Arbel et al. ............... 379/211.02 |
| 5,309,028 | A | 5/1994 | Brown et al. |
| 5,533,109 | A | 7/1996 | Baker |
| 5,600,654 | A | 2/1997 | Brown et al. |
| 5,754,636 | A * | 5/1998 | Bayless et al. ............. 379/142.1 |
| 5,867,568 | A | 2/1999 | Ackerman et al. |
| 5,878,123 | A | 3/1999 | Boakes |
| 6,128,375 | A | 10/2000 | Punzalan et al. |
| 6,263,061 | B1 * | 7/2001 | Tanaka et al. ................. 379/156 |
| 6,295,456 | B1 | 9/2001 | Baker et al. |
| 6,304,644 | B2 | 10/2001 | Karnowski |
| 6,542,475 | B1 * | 4/2003 | Bala et al. ..................... 370/271 |
| 6,633,635 | B2 | 10/2003 | Kung et al. |
| 6,650,748 | B1 | 11/2003 | Edwards et al. |
| 6,763,092 | B1 * | 7/2004 | Borland ..................... 379/88.21 |
| 7,006,618 | B1 | 2/2006 | Shaffer et al. |
| 7,515,695 | B1 | 4/2009 | Chan et al. |
| 2002/0055351 | A1 | 5/2002 | Elsey et al. |
| 2002/0075851 | A1 | 6/2002 | Brumm et al. |
| 2003/0007606 | A1 * | 1/2003 | Suder et al. ................. 379/32.04 |
| 2003/0018901 | A1 | 1/2003 | Burritt et al. |
| 2003/0112930 | A1 * | 6/2003 | Bosik et al. ................. 379/88.17 |
| 2003/0152209 | A1 * | 8/2003 | Andreason ............... 379/211.01 |
| 2003/0185375 | A1 | 10/2003 | Albal |
| 2003/0215078 | A1 * | 11/2003 | Brahm et al. ............. 379/211.02 |
| 2004/0001579 | A1 * | 1/2004 | Feinberg et al. ............. 379/156 |
| 2004/0001580 | A1 | 1/2004 | Mason |
| 2004/0086102 | A1 * | 5/2004 | McMurry et al. ............. 379/219 |
| 2004/0128144 | A1 * | 7/2004 | Johnson et al. ............... 704/278 |
| 2004/0148395 | A1 | 7/2004 | Schulzrinne |
| 2004/0198361 | A1 * | 10/2004 | Amin ........................... 455/445 |
| 2004/0240650 | A1 | 12/2004 | Bear et al. |
| 2004/0264660 | A1 | 12/2004 | McCullough et al. |
| 2004/0266426 | A1 * | 12/2004 | Marsh et al. ................ 455/426.2 |
| 2005/0174990 | A1 | 8/2005 | Riemann et al. |
| 2005/0238157 | A1 * | 10/2005 | Shaffer et al. ............ 379/211.01 |

OTHER PUBLICATIONS

Avaya, Inc., Support: Which Feature Button Provides an Appearance of Another User's Extension on His Telephone?, 2004 [Retrieved Jan. 6, 2005], Retrieved from the Internet, http://support.avaya.com/japple/css/japple?temp.groupID=107529&temp.selectedFamily=107557&temp.selectedProduct=107602&temp.selectedBucket=108020&temp.feedbackState=askForFeedback&temp.documentID=109252&temp.selectedRelease=128418&PAGE=avaya.css.CSSLvl1Detail&executeTransaction=avaya.css.UsageUpdate( ), 4pgs.

ShoreTel, Inc., Datasheet: Operator Call Manager, 2004 [Retrieved Jan. 6, 2005], Retrieved from the Internet, http://www.shorelinecommunications.com/STCorp/products/documents/ST-Dsheet-Operator.pdf, 2 pgs.

ShoreTel, Inc., Datasheet: ShorePhone Telephones, 2004 [Retrieved Jan. 6, 2005], Retrieved from the Internet, http://www.shorelinecommunications.com/STCorp/products/documents/ST-Dsheet-Telephones.pdf, 4 pgs.

ShoreTel, Inc., News Release: ShoreTel4.3 IP PBX Empowers the Mobile Workforce, Nov. 17, 2003 [Retrieved Jan. 6, 2005], Retrieved from the Internet, http://www.shorelinecommunications.com/STCorp/press/2003-11-17.aspx, 3 pgs.

ShoreTel, Inc., Products: Operator, 2004 [Retrieved Jan. 6, 2005], Retrieved from the Internet, http://www.shorelinecommunications.com/STCorp/products/operator.aspx, 6 pgs.

ShoreTel, Inc., Products: Telephones: Key Features, 2004 [Retrieved Jan. 6, 2005], Retrieved from the Internet, http://www.shorelinecommunications.com/STCorp/products/telephones-features.aspx, 8 pgs.

Telcordia Technologies Inc., GR-575-CORE LSSGR: Class Feature: Calling Identity Delivery on Call Waiting (FSD Jan. 2, 1090), Jun. 2000, [Retrieved Jan. 24, 2005], Retrieved from the Internet, http://telecom-info.telcordia.com/site-cgi/ido/newcust.pl?page=idosearch&docnum=GR-575, 5 pgs.

* cited by examiner

IP560

IP100

EXTENSION MONITORING IN A DISTRIBUTED TELEPHONY SYSTEM

CROSS-REFERENCE TO RELATED APPLICATIONS

This application is a continuation of prior U.S. application Ser. No. 10/932,614, filed Sep. 1, 2004, now U.S. Pat. No. 8,503,640, issued Aug. 6, 2013, which is herein incorporated in its entirety by reference.

REVISIT NOTICE

Applicants hereby notify the USPTO that the claims of the present application are different from those of the parent application (U.S. patent application Ser. No. 10/932,614) and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

TECHNICAL FIELD

This invention relates generally to distributed telephony, and more particularly, to features associated with monitoring extensions in a distributed telephony system.

BACKGROUND

The ability for one person to monitor another person's extension is useful in a variety of situations. For example, an administrative assistant can monitor an executive's extension, including whether the extension has a call offering or is in use. As another example, a customer service agent can monitor another agent's extension when the second agent is away from her desk. It is also useful if the monitoring party (e.g., the assistant or agent) can perform functions on a call destined for a monitored extension. These functions can include, for example, answering the call, transferring the call, placing the call on hold, and sending the call to voicemail.

While extension monitoring exists in traditional, keyed telephone systems, it is difficult to implement in enterprise telephony systems. Enterprises often have several offices or call centers that are located in a plurality of disparate locations. To interconnect all of these sites, enterprise telephony systems have been developed. Enterprise telephony systems, which comprise a distributed set of voice switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers, and application services.

What is needed is a system and method that enables a user to monitor an extension using an enterprise telephony system.

SUMMARY OF THE INVENTION

Computer-integrated functionality is implemented using a server in a distributed telephony environment. The server includes a telephony management software (TMS) unit, a telephony application programming interface (TAPI) unit, and an application unit, which are communicatively coupled. The server is coupled to one or more endpoints, such as analog phones, IP-based phones, and software phones. The server is also coupled to one or more software applications that control these endpoints. These software applications can be, for example, desktop software applications employed by end-users to perform specific tasks or server-side applications that enable higher levels of functionality.

In one embodiment, an application unit enables a monitoring device to monitor an extension and perform functions on calls offering on the extension. An application unit can include several interconnected modules, such as a control module, an association module, a presentation module, a park module, a monitoring device interface module, and a storage interface module.

One user's extension (the "monitored extension") is associated with a second user's monitoring device, such as an IP phone. A server detects call activity on the first user's monitored extension and sends information to the second user's IP phone. In one embodiment, the server detects a call offering on the monitored extension and instructs the IP phone to display the calling party's name and phone number.

If there are multiple calls offering on the first user's monitored extension, the second user can navigate through them by, for example, activating a scroll key. The key activation causes information to be sent from the second user's IP phone to the server. In response, the server instructs the IP phone to display different information (e.g., information associated with a different call offering).

The second user can also perform functions on a call destined for the first user's monitored extension. For example, the second user can pickup (answer) the call, which redirects the call from the first user's extension to the second user's extension. In one embodiment, the second user uses her IP phone to navigate to a particular call offering on the second user's monitored extension. The second user then activates an "answer" key on her IP phone. The key activation causes information to be sent from the second user's IP phone to the server. In response, the server instructs the switch that manages the first user's monitored extension to redirect the call to the second user's extension. Additional functions that the second user can perform on a call destined for the first user's monitored extension include sending the call to voicemail.

Further features of the invention, its nature, and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention can be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. Overview of Extension Monitoring

A monitoring device enables a user to monitor an extension other than her own by presenting the user with status information regarding that extension. In one embodiment, a monitoring device also enables a user to perform functions on calls directed to that extension, such as transferring calls, placing calls on hold, and sending calls to voicemail. A monitoring device can monitor only one extension or a plurality of extensions. In addition, one extension can be monitored by one or more monitoring devices. A monitoring device can be, for example, an endpoint or a software application. A monitoring device can be configured (for example, regarding which extensions it should monitor) by using the device itself or by using a software application that runs on a general-purpose computer, such as a server.

In general, extension monitoring is implemented as follows: An extension (the "monitored extension") is associated with a monitoring device. A server detects call activity on the monitored extension and sends information regarding this activity to the monitoring device. For example, the server detects a call offering on the monitored extension. The server determines the caller ID of the calling party and sends this information to the monitoring device.

In one embodiment, the monitoring device can interact with a call on the monitored extension. In this embodiment, the server receives information from the monitoring device (for example, due to the user having pressed a key) that causes the server to perform certain actions. These actions can include, for example, instructing a switch to transfer the call, hold the call, or send the call to voicemail. A switch can also be instructed to "park" the call (i.e., hold the call at the monitored extension).

B. System Architecture

Figure 1:
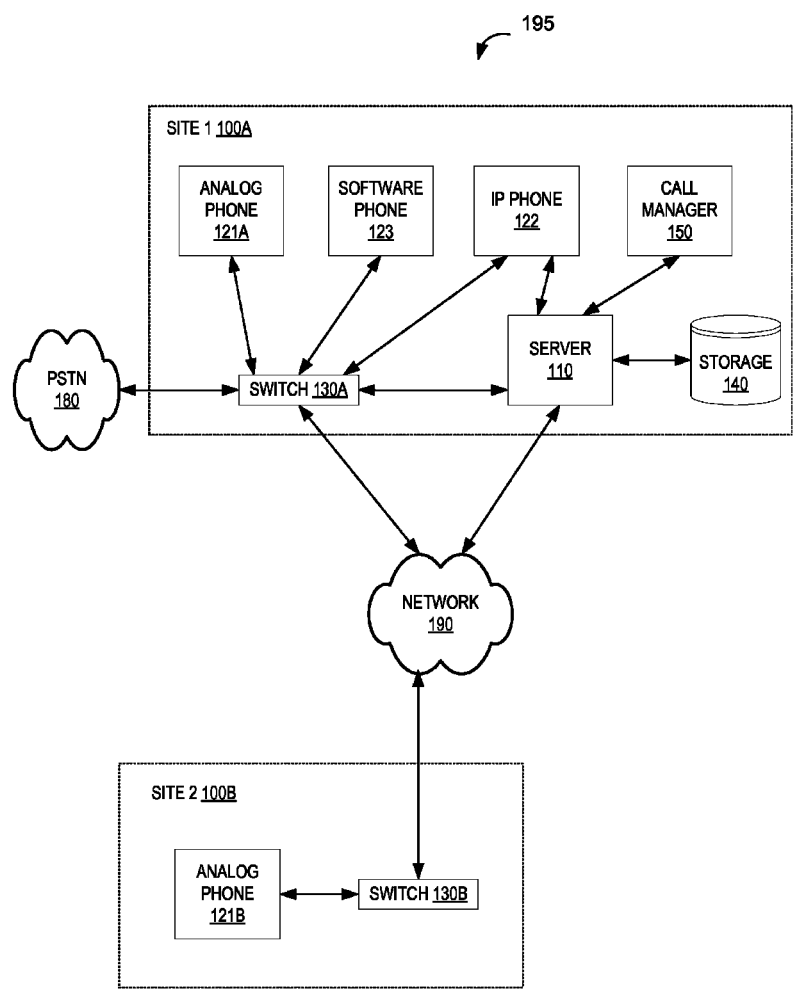
FIG. 1 illustrates a block diagram of a distributed telephony system architecture, according to one embodiment of the present invention.

FIG. 1 illustrates a block diagram of a distributed telephony system architecture, according to one embodiment of the present invention. The illustrated embodiment of architecture 195 includes a first site 100A and a second site 100B. As used herein, a site represents a grouping of resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The system 195 architecture in FIG. 1 is used only by way of example. While FIG. 1 illustrates two sites, the present invention applies to any system architecture containing one or more sites.

The first site 100A includes a server 110, a switch 130A, three endpoints (analog phone 121A, 1P phone 122, and software phone 123), a device running a call manager software application 150, and a storage device 140. The switch 130A represents a Voice over Internet Protocol (VoIP) device to which a number of endpoints can be coupled, such as analog phones 121, IP phones 122, and software phones (softphones) 123. In the illustrated embodiment, the switch 130A is coupled to the network 190. The switch 130A is also coupled to the public switched telephone network (PSTN) 180 via an analog or digital trunk line (e.g., a T1 or E1 interface). In the illustrated configuration, the switch 130A provides an interface for calls originating from or terminating on the PSTN 180.

An endpoint enables a user to carry on a phone call. Although in the illustrated embodiment the first site 100A has three endpoints (one analog phone 121A, one IP phone 122, and one softphone 123), in other embodiments the first site 100A has different numbers and types of endpoints. An endpoint is coupled to a switch 130, a server 110, or both.

An endpoint has a user interface to send data to and receive data from a user. The analog phone 121A has, for example, a Telephone User Interface (TUI) that sends data through a speaker and receives data through a microphone and a keypad. The IP phone 122 has, for example, both a TUI and a graphical user interface that sends data through a display device associated with the IP phone 122. In one embodiment, the IP phone's graphical user interface also receives data from a touchscreen display device associated with the IP phone 122. The softphone 123 has, for example, a software application that runs on a computer and sends data through a display device and a speaker and receives data through a microphone, a keyboard, and a pointing device.

A device running a call manager software application 150, such as a computer, controls one or more endpoints with which it is associated. Call manager 150 offers a user an interface through which he can perform call-related functions.

Although in the illustrated embodiment the first site 100A has only one call manager 150, in other embodiments the first site 100A has a different number of call managers 150. Also, more than one call manager 150 can control the same endpoint. The association between a call manager 150 and an endpoint that it controls is accessed through the server 110.

The server 110 is configured to implement features or functions of the present invention. The server 110 is coupled to the network 190 and can also be coupled to one or more endpoints, such as IP phone 122 and softphone 123. The server 110 will be further discussed below with reference to FIGS. 2-6.

The storage device 140 contains extension monitoring information, including associations between monitored extensions and monitoring devices and information regarding the presentation status of a monitoring device. In the illustrated embodiment, the storage device 140 is directly coupled to the server 110. In an alternate embodiment, the storage device 140 is coupled to the server 110 via the network 190.

One skilled in the art will appreciate that additional networking devices (not shown) can be added to the first site 100A, for example, if needed to support additional endpoints, servers 110, or other systems. For example, the first site 100A can include a second switch 130 and an edge router to couple the first site 100A to the network 190 and to provide local area connectivity for the first and second switches 130A, 130B. One skilled in the art will also recognize that numerous configurations of switches 130 and communications links are contemplated. For example, PSTN links can be coupled to multiple switches 130 at several points within the topology and softswitches 130 can also be used.

The second site 100B similarly includes an endpoint (analog phone 121B) and a switch 130B. The configuration of the second site 100B demonstrates that a server is not required for each site. Switch 130B of the second site 100B can be managed by server 110 that is illustrated in the first site 100A. A call can involve more than one switch. For example, a call that originates from the PSTN 180 and terminates on an endpoint that is communicatively coupled to switch 130B of the second site 100B involves two switches: switch 130A of the first site 100A and switch 130B of the second site 100B. In addition, each switch 130 may be managed by a different server 110.

In one embodiment of the present invention, the network 190 is a partially public or a wholly public network such as the Internet. The network 190 can also be a private network or include one or more distinct or logical private networks (e.g., virtual private networks or wide area networks). Additionally, the communication links to and from the network 190 can be wireline or wireless (i.e., terrestrial- or satellite-based transceivers). In one embodiment of the present invention, the network 190 is an IP-based wide or metropolitan area network.

C. Server Architecture

Figure 2:
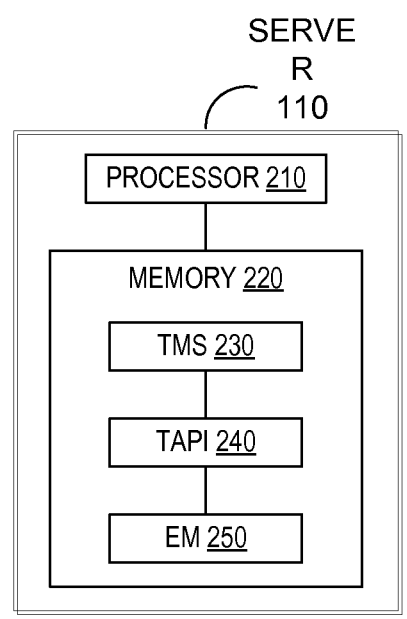
FIG. 2 illustrates a block diagram of a server architecture, according to one embodiment of the present invention.

FIG. 2 illustrates a block diagram of a server architecture, according to one embodiment of the present invention. In this embodiment, server 110 is configured to implement features or functions of the present invention. Server 110 includes a processor 210. The processor 210 can be a conventional processing device, such as a general-purpose microprocessor.

Server 110 also includes a memory 220. The memory 220 includes program instructions or functional units that implement features of the present invention. Specifically, the memory 220 includes a telephony management software (TMS) unit 230 and a telephony application programming interface (TAPI) unit 240.

In one embodiment, the memory 220 also includes one or more application units that interact with the TMS unit 230 and the TAPI unit 240 to enable a specific computer-integrated function. An application unit uses the TAPI unit 240 to exchange data with the TMS unit 230. The TMS unit 230 is able to communicate with and manage one or more switches. For example, with reference to FIG. 1, the TMS unit 230 included in the server 110 can manage the switches 130A, 130B. Through the TAPI unit 240, the TMS unit 230 presents an application with a computer-telephony integration (CTI) view of these switches 130A, 130B. This allows the application to manage the switches 130A, 130B. Such switches 130A, 130B can operate without an associated TMS unit 230 if CTI features are not being used.

D. Application Unit Architecture

In the illustrated embodiment, the server 110 includes one application unit—extension monitoring (EM) unit 250. In general, the EM unit 250 enables a monitoring device to monitor an extension and perform functions on calls offering on the extension. The functionality of the EM unit 250 will be further described below with reference to FIGS. 4-7.

In one embodiment, EM unit 250 is implemented as a service that interacts with TMS unit 230. Communication or data exchange between TMS unit 230 and EM unit 250 is further described with reference to FIG. 3. Although EM unit 250 is illustrated as executing on the server 110, EM unit 250 may be distributed among computing devices as is known to one of skill in the art. For example, the functionality enabled by EM unit 250 can be implemented in a client-server fashion by having the client (user's local system, such as a general-purpose computer or endpoint) perform some functions and having the server 110 (EM unit 250) perform others. As another example, some or all of the functionality enabled by EM unit 250 can be implemented by having a switch 130 perform some or all functions.

Figure 3:
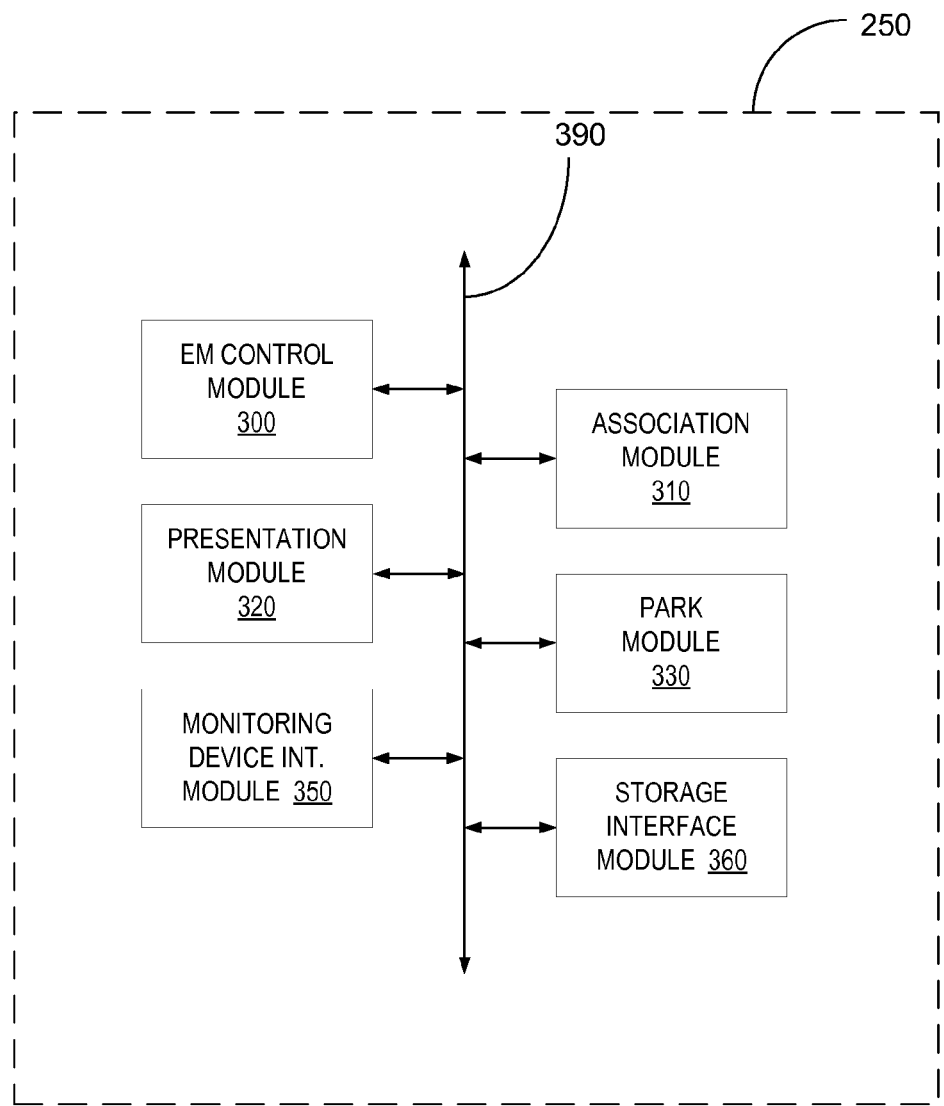
FIG. 3 illustrates a block diagram of an extension monitoring unit, according to one embodiment of the present invention.

FIG. 3 illustrates a block diagram of an extension monitoring unit, according to one embodiment of the present invention. Generally, EM unit 250 includes several modules for monitoring an extension and performing functions on calls offering on the extension. In the illustrated embodiment, EM unit 250 includes EM control module 300, association module 310, presentation module 320, park module 330, monitoring device interface module 350, and storage interface module 360. A data bus 390 communicatively couples each of the modules 300, 310, 320, 330, 350, 360.

The modules 300, 310, 320, 330, 350, 360 include program instructions that can be executed on, for example, processor 210 to implement the features or functions of the present invention. The modules 300, 310, 320, 330, 350, 360 are typically stored in a memory, such as memory 220. For server 110, the program instructions can be distributed on a computer-readable medium or storage device 140. The computer-readable storage device 140 can be available via a public network, a private network, or the Internet. Program instructions can be in any appropriate form, such as source code, object code, or scripting code.

EM control module 300 centrally controls the operation and process flow of EM unit 250, transmitting instructions and data to as well as receiving data from each module 300, 310, 320, 330, 350, 360. Details of its operation will be discussed below with reference to FIGS. 4-7.

Association module 310 determines whether a given extension is being monitored by one or more monitoring devices. If the extension is being monitored, association module 310 determines the identities of the one or more monitoring devices. In order to do this, association module 310 queries storage interface module 360.

Presentation module 320 assembles a signal to send to a monitoring device that causes the monitoring device to display certain information. In one embodiment, this information includes the status of a monitored extension (such as whether the extension has a call offering or is in use) and information regarding a call on the extension (such as the calling party's name and phone number). In another embodiment, this information can be localized (e.g., using Unicode characters and a Unicode-enabled monitoring device).

In order to assemble the signal, presentation module 320 queries TMS unit 230 by using TAPI unit 240. This gives presentation module 320 access to the switch 130 that manages calls destined for the monitored extension. From this switch 130, presentation module 320 can determine the status of the extension and information regarding calls on the extension.

Park module 330 assembles a signal to send to the switch 130A that causes the switch 130A to park a call (i.e., hold a call at the monitored extension rather than at the extension that was used to answer the call).

Monitoring device interface module 350 sends data to and receives data from monitoring devices, such as endpoints and devices running call manager software 150 that controls these endpoints. Monitoring device interface module 350 communicates with call manager 150 directly, while it communicates with and endpoint either directly or via a switch 130, depending on the type of the endpoint. For example, monitoring device interface module 350 communicates with IP phone 122 directly but communicates with analog phone 121A through switch 130A.

Data sent to a monitoring device is assembled by presentation module 320 and causes the monitoring device to display certain information. Data received from a monitoring device comprises information such as, for example, which extension to associate with the monitoring device, instructions for navigating through call information, and instructions to transfer or hold a call. In one embodiment, a signal indicates which monitoring device generated it.

Storage interface module 360 accesses information stored in storage device 140. As described above, storage device 140 contains extension monitoring information, including associations between monitored extensions and monitoring devices and information regarding the presentation status of a monitoring device.

E. Methods

Figure 4:
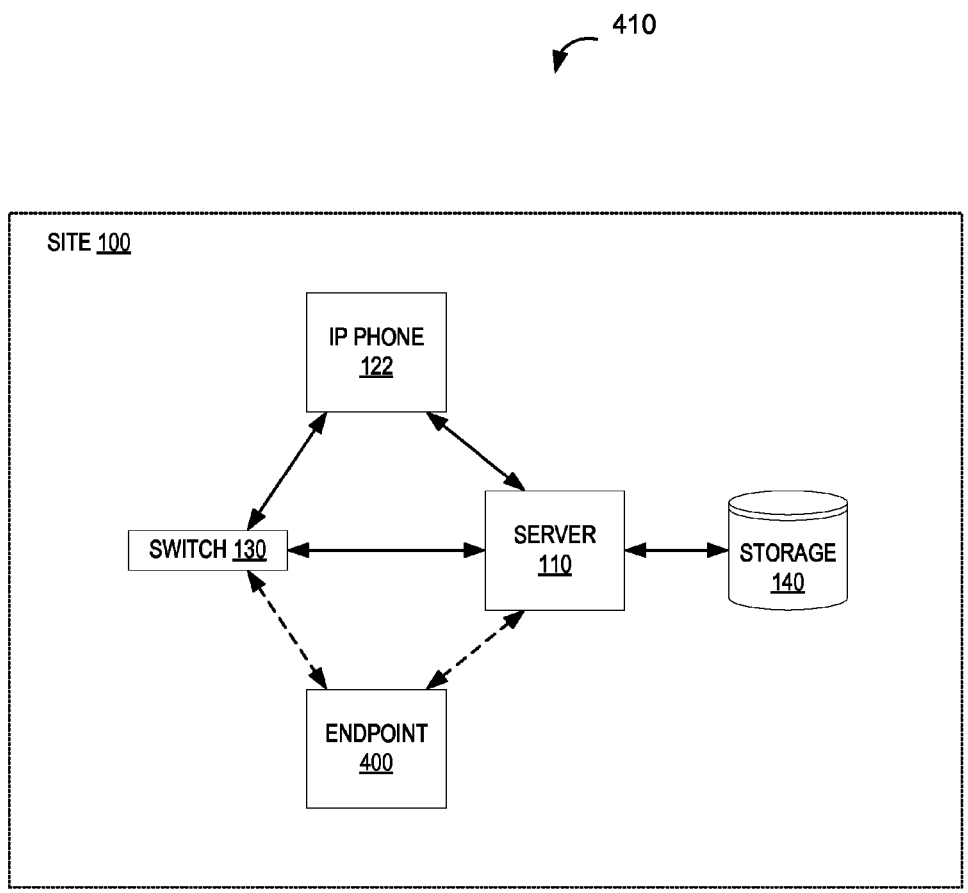
FIG. 4 illustrates a block diagram of a portion of a distributed telephony system architecture, according to one embodiment of the present invention.

Details of modules 300, 300, 310, 320, 330, 350, 360 will be further explained with reference to FIGS. 4-7. FIG. 4 illustrates a block diagram of a portion of a distributed telephony system architecture, according to one embodiment of the present invention. The illustrated embodiment of architecture 410 includes one site 100. Site 100 includes a server 110, an IP phone 122, a switch 130, a storage device 140, and an endpoint 400. Endpoint 400 can be any type of endpoint, such as an analog phone 121, an IP phone 122, or a softphone 123. Endpoint 400 is coupled to server 110, switch 130, or both, depending on its type. IP phone 122 is coupled to both server 110 and switch 130. Server 110 is also coupled to switch 130 and storage device 140. Server 110, IP phone 122, switch 130, storage device 140, and endpoint 400 are similar to how they were described above with reference to FIG. 1. While IP phone 122 is used by way of example, an analog phone 121 could be used in place of IP phone 122.

Figure 5:
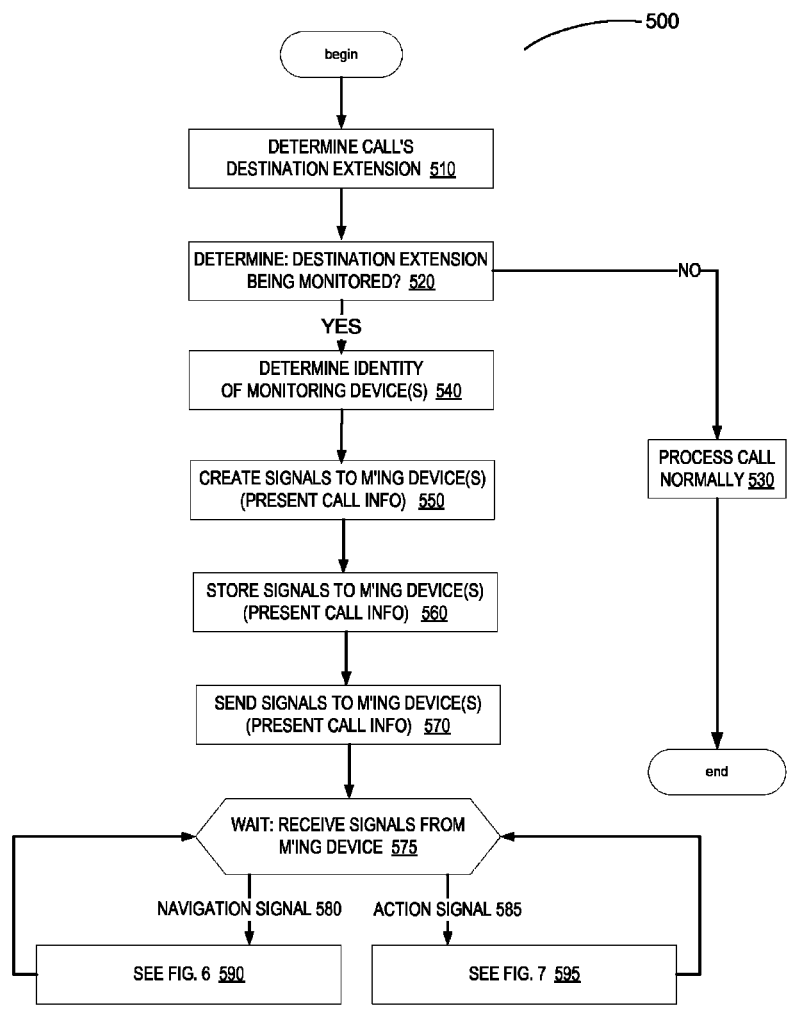
FIG. 5 illustrates a flowchart of a method performed by a server for enabling extension monitoring, according to one embodiment of the present invention.

FIG. 5 illustrates a flowchart of a method performed by a server for enabling extension monitoring, according to one embodiment of the present invention. The method 500 of FIG. 5 would be performed once for each call coming into a site 100. In one embodiment, different calls are handled in parallel. Method 500 will be explained with reference to FIG. 4, in which IP phone 122 will be a first user's monitoring device and endpoint 400 will be a second user's endpoint that generally receives calls destined for the second user's extension (the "monitored extension").

Figure 9A:
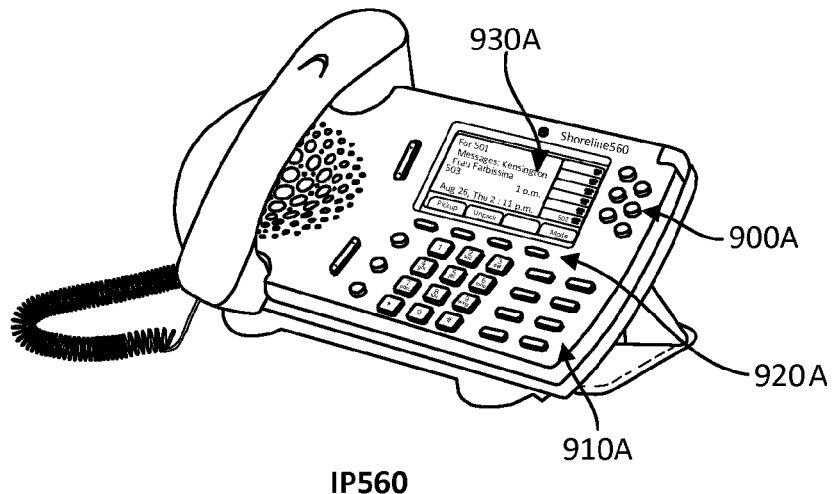
FIG. 9A is a perspective view of an IP phone showing various features, according to one embodiment of the invention.

In one embodiment, IP phone 122 includes call appearance keys 900, feature keys 910, soft keys 920, and a display 930. FIG. 9A is a perspective view of an IP phone showing various features, according to one embodiment of the invention. In the illustrated embodiment, IP phone 122 is a ShorePhone IP 560 Business Telephone manufactured and sold by ShoreTel, Inc. of Sunnyvale, Calif. In the illustrated embodiment, there are six call appearance keys 900A, which are tri-color light emitting diodes (LEDs). There are also eight feature keys 910A and four soft keys 920A. In the illustrated embodiment, display 930A has a width of twenty-four characters and a height of seven lines. Display 930A has a grayscale resolution of 160 by 80 pixels and is also backlit.

Figure 9B:
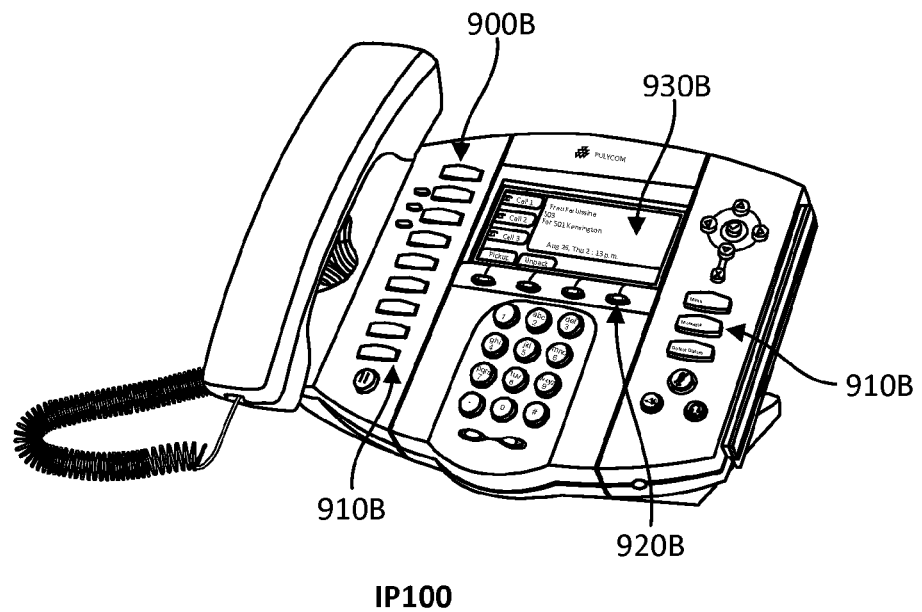
FIG. 9B is a perspective view of an IP phone showing various features, according to another embodiment of the invention.

FIG. 9B is a perspective view of an IP phone showing various features, according to another embodiment of the invention. In the illustrated embodiment, IP phone 122 is a ShorePhone IP 100 Business Telephone sold by ShoreTel, Inc. of Sunnyvale, Calif. In the illustrated embodiment, there are three call appearance keys 900B, nine feature keys 910B, and four soft keys 920B. In the illustrated embodiment, display 930B has a width of twenty characters and a height of five lines. Display 930B has a resolution of 100 by 35 pixels.

Figure 10A:
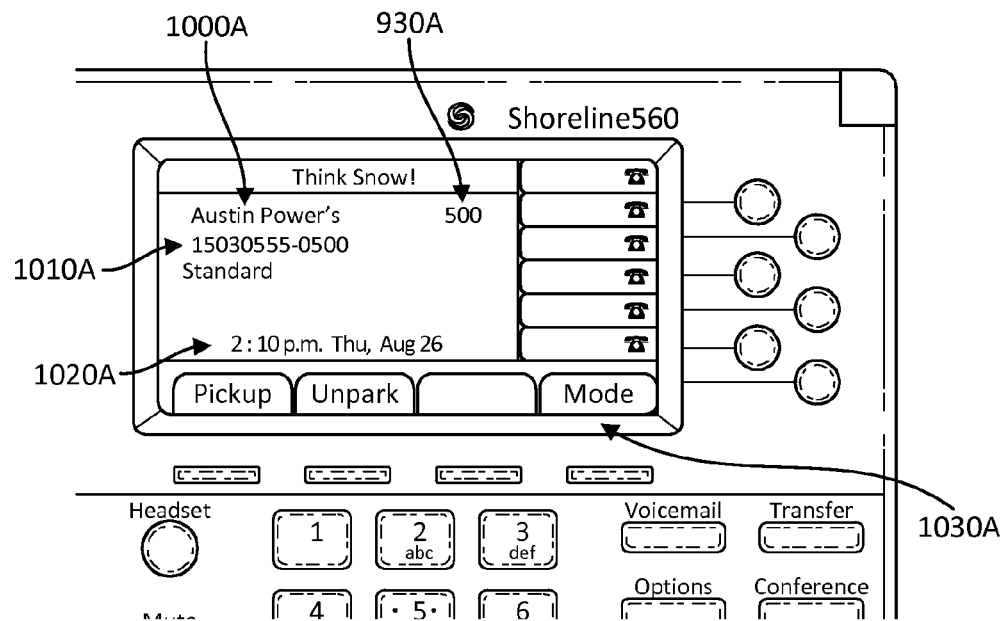
FIG. 10A is a plan view, partially in section, of a portion of the IP phone in FIG. 9A showing a display, keys, and no monitored extensions, according to one embodiment of the present invention.

In one embodiment, when IP phone 122 is set up to monitor no extensions, its display 930 includes one or more portions dedicated to display various pieces of information, including the user's name and extension number 1000, the user's phone number 1010, the time and date 1020, and the functions 1030 currently associated with the soft keys 920. FIG. 10A is a plan view, partially in section, of a portion of the IP phone in FIG. 9A showing a display, keys, and no monitored extensions, according to one embodiment of the present invention. In the illustrated embodiment, the display 930A includes one or more portions dedicated to display the user's name and extension number 1000A, the user's phone number 1010A, the time and date 1020A, and the functions 1030A currently associated with the soft keys 920A.

Figure 10B:
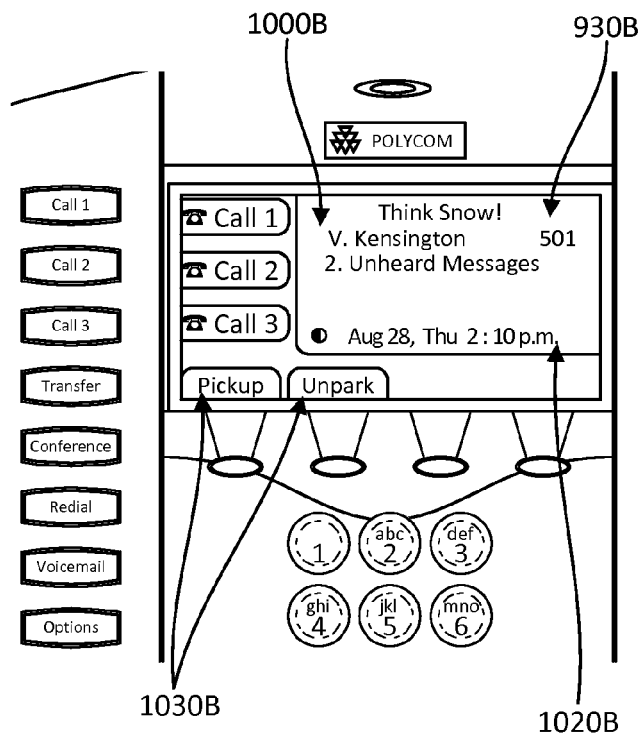
FIG. 10B is a plan view, partially in section, of a portion of the IP phone in FIG. 9B showing a display, keys, and no monitored extensions, according to one embodiment of the present invention.

FIG. 10B is a plan view, partially in section, of a portion of the IP phone in FIG. 9B showing a display, keys, and no monitored extensions, according to one embodiment of the present invention. In the illustrated embodiment, the display 930B includes one or more portions dedicated to display the user's name and extension number 1000B, the time and date 1020B, and the functions 1030B currently associated with the soft keys 920B.

In one embodiment, when IP phone 122 is configured to monitor one or more extensions, its display 930 includes one or more portions dedicated to display various pieces of information, including the numbers of the monitored extensions 1100 and the status of the monitored extensions and the monitoring extension vis-à-vis the monitored extensions 1110. In one embodiment, the status of a monitored extension can be, for example: idle; idle and in do-not-disturb (DND) mode; has an unheard message; has an unheard message and is in DND mode; has an active conference call with a party other than the monitoring extension; has a held call; has a held or parked call with a party other than the monitoring extension; has a connected call; has an offering call; and has both a connected call and an offering call. In one embodiment, the status of a monitoring extension vis-à-vis a monitored extension can be, for example: has a call that was picked up or unparked from the monitored extension; has a conference call that was picked up or unparked from the monitored extension; and has a conference call with a third party that was picked up or unparked from the monitored extension and the third party has the conference call on hold.

In one embodiment, IP phone 122 includes keys (for example, call appearance keys 900, feature keys 910, or soft keys 920) associated with the monitored extensions. In one embodiment, when there is one call offering on a monitored extension, activating the key associated with that extension picks up (answers) the call offering on that extension. In another embodiment, when there are multiple calls offering on a monitored extension, activating the associated key picks up the oldest call offering on that extension (i.e., the call offering that began earliest in time). In yet another embodiment, when there are no calls offering on a monitored extension, activating the associated key dials the monitored extension.

In one embodiment, a key associated with a monitored extension indicates the status of the monitored extension and/or the status of the monitoring extension vis-à-vis that monitored extension. In one embodiment, the status of a monitored extension can be, for example: idle; idle and in do-not-disturb (DND) mode; has an unheard message; has an unheard message and is in DND mode; has an active conference call with a party other than the monitoring extension; has a held call; has a held or parked call with a party other than the monitoring extension; has a connected call; has an offering call; and has both a connected call and an offering call. In one embodiment, the status of a monitoring extension vis-à-vis a monitored extension can be, for example: has a call that was picked up or unparked from the monitored extension; has a conference call with a third party that was picked up or unparked from the monitored extension and the third party has the conference call on hold; and has a conference call that was picked up or unparked from the monitored extension.

Figure 11A:
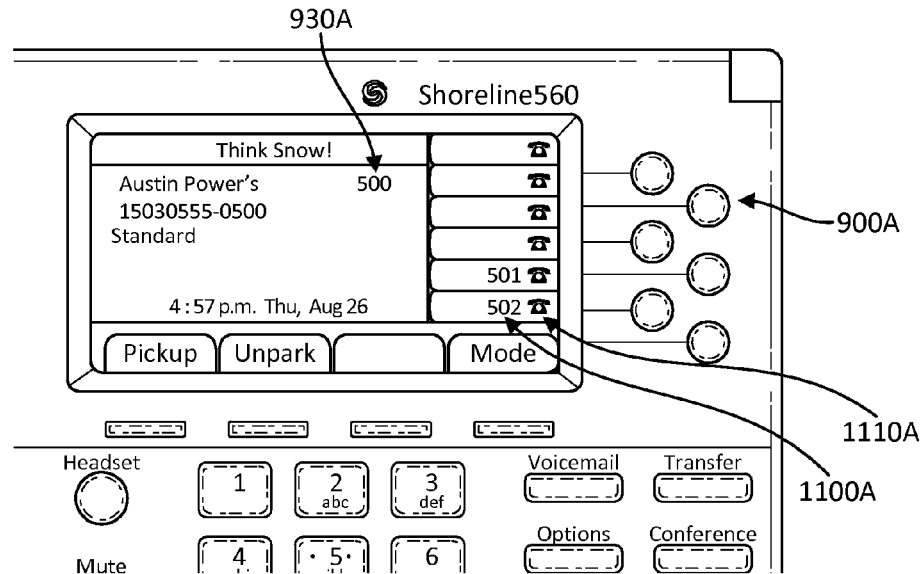
FIG. 11A is a plan view, partially in section, of a portion of the IP phone in FIG. 9A showing a display, keys, and two monitored extensions, according to one embodiment of the present invention.

FIG. 11A is a plan view, partially in section, of a portion of the IP phone in FIG. 9A showing a display, keys, and two monitored extensions, according to one embodiment of the present invention. In the illustrated embodiment, the display 930A includes one or more portions dedicated to display the numbers of the monitored extensions 1100A and the status of the monitored extensions and the monitoring extension vis-à-vis the monitored extensions 1110A. In one embodiment, various icons are used to indicate the status of a monitored extension. For example, an icon of a tape is used to indicate that a monitored extension has an unheard message, while an icon of a tape with a line through it indicates that a monitored extension has an unheard message and is in DND mode.

In this embodiment, call appearance keys 900A are associated with the monitored extensions. In the illustrated embodiment, a call appearance key 900A contains an LED, and the color and behavior of the LED indicates the status of the monitored extension associated with the key 900A. In one embodiment, the status of a monitored extension can be, for example: idle (amber, steady); idle and in do-not-disturb (DND) mode (amber, steady); has an unheard message (unlit); has an unheard message and is in DND mode (amber, steady); has an active conference call with a party other than the monitoring extension (red, steady); has a held or parked call with a party other than the monitoring extension (green, blinking); has an offering call (amber, blinking); and has both a connected call and an offering call (red, blinking) In one embodiment, the status of a monitoring extension vis-à-vis a monitored extension can be, for example: has a call that was picked up or unparked from the monitored extension (green, steady); has a conference call with a third party that was picked up or unparked from the monitored extension and the third party has the conference call on hold (green, steady); and has a conference call that was picked up or unparked from the monitored extension (green, steady).

Figure 11B:
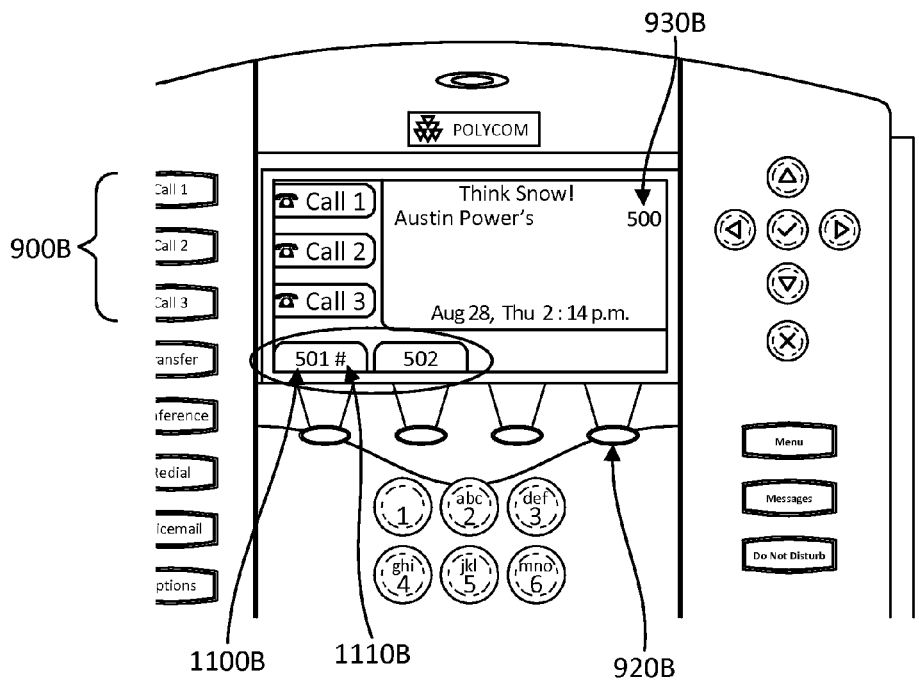
FIG. 11B is a plan view, partially in section, of a portion of the IP phone in FIG. 9B showing a display, keys, and two monitored extensions, according to one embodiment of the present invention.

FIG. 11B is a plan view, partially in section, of a portion of the IP phone in FIG. 9B showing a display, keys, and two monitored extensions, according to one embodiment of the present invention. In this embodiment, soft keys 920B are associated with the monitored extensions. In the illustrated embodiment, the display 930B includes one or more portions dedicated to display the numbers of the monitored extensions 1100B and the status of the monitored extensions 1110B. In one embodiment, the following symbols are used to indicate the status of a monitored extension: * (has a connected call); # (has an offering call); @ (has both a connected call and an offering call); +(has a held call); and ! (has an unheard message).

In one embodiment, when IP phone 122 receives an offering call, its display 930 includes one or more portions dedicated to display various pieces of information, including the destination party's extension number and name 800 and the calling party's extension number and name 810. Information displayed at one time can be regarding only one offering call or regarding multiple offering calls.

In one embodiment, although information displayed at one time is regarding only one offering call, display 930 also includes one or more portions dedicated to indicate whether there are multiple calls offering. In one embodiment, the presence of a symbol indicates that there are multiple calls offering.

In one embodiment, when there are multiple offering calls, they are listed in the order that they were received, where a call listed first occurred earlier in time than a call listed last. In one embodiment, the multiple call symbol is directional, such as an arrow or a caret (^ or v). The symbol's presence/absence indicates whether there is/is not, respectively, a call that occurred earlier (up arrow or caret) or later (down arrow or caret) than the one being viewed.

Figure 8A:
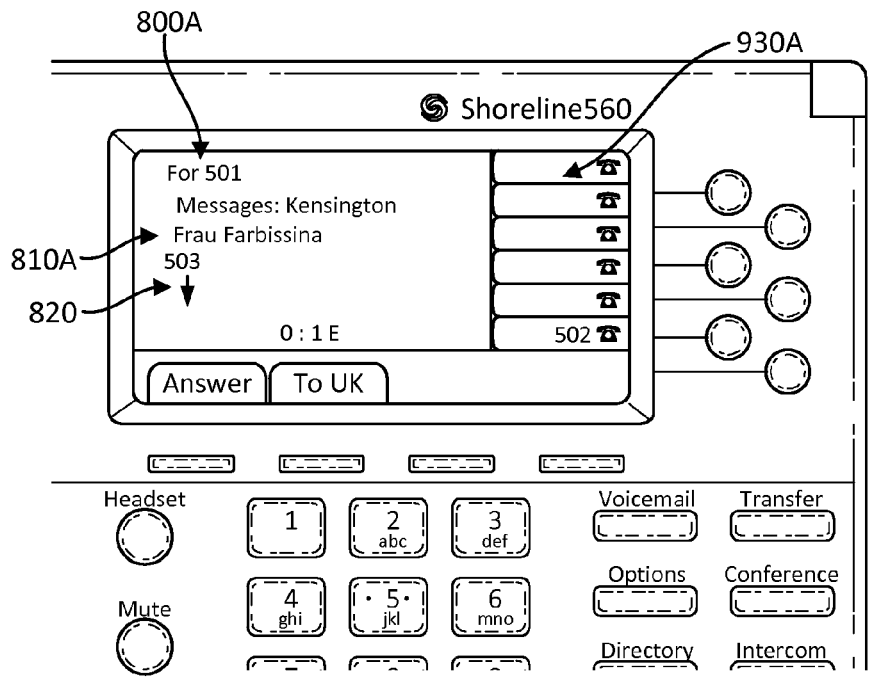
FIG. 8A is a plan view, partially in section, of a portion of the IP phone in FIG. 9A showing a display, keys, two monitored extensions, and multiple offering calls, according to one embodiment of the present invention.

FIG. 8A is a plan view, partially in section, of a portion of the IP phone in FIG. 9A showing a display, keys, two monitored extensions, and multiple offering calls, according to one embodiment of the present invention. In the illustrated embodiment, display 930A includes one or more portions dedicated to display a destination party's extension number and name 800A and a calling party's extension number and name 810A. In the illustrated embodiment, although only one call offering is listed, a down arrow 820 indicates that the user can scroll down to view additional offering calls that occurred later.

Figure 8B:
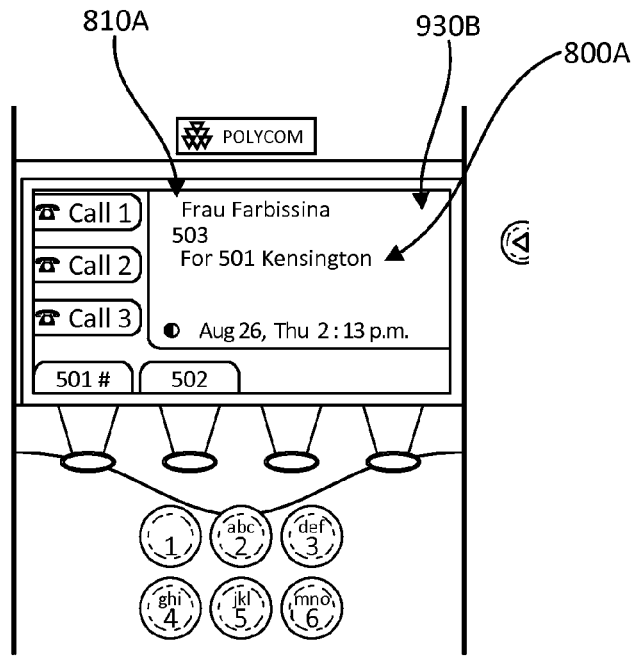
FIG. 8B is a plan view, partially in section, of a portion of the IP phone in FIG. 9B showing a display, keys, two monitored extensions, and multiple offering calls, according to one embodiment of the present invention.

FIG. 8B is a plan view, partially in section, of a portion of the IP phone in FIG. 9B showing a display, keys, two monitored extensions, and multiple offering calls, according to one embodiment of the present invention. In the illustrated embodiment, display 930B includes one or more portions dedicated to display a destination party's extension number and name 800B and a calling party's extension number and name 810B.

Before the method 500 of FIG. 5 begins, switch 130 in site 100 receives a call. This call is destined for an extension, for example the extension associated with endpoint 400. Switch 130 communicates to server 110 that a call has been received, and method 500 begins.

EM control module 300 uses TAPI unit 240 to determine 510 the call's destination extension. EM control module 300 then uses association module 310 to determine 520 whether the destination extension is associated with a monitoring device (such as IP phone 122). If the extension is not associated with a monitoring device, the call is processed 530 normally, and method 500 ends. If the extension is associated with one or more monitoring devices, EM control module 300 uses association module 310 to determine 540 the identities of the monitoring devices and continues processing the call.

EM control module 300 uses presentation module 320 to create 550 signals to send to the monitoring devices. These signals can be identical or they can differ based on the type of the destination monitoring device and its capabilities.

EM control module 300 uses storage interface module 360 to store 560 these signals in storage device 140. Since these signals specify the information presented by a monitoring device, storing these signals enables later determination of what information is then being presented by the monitoring device.

EM control module 300 uses monitoring device interface module 350 to send 570 these signals to the monitoring devices. These signals cause the monitoring devices to present to the user information regarding the call to the monitored extension. Examples of information presentations were discussed above with reference to FIGS. 11A, 11B, 8A, and 8B.

Figure 6:
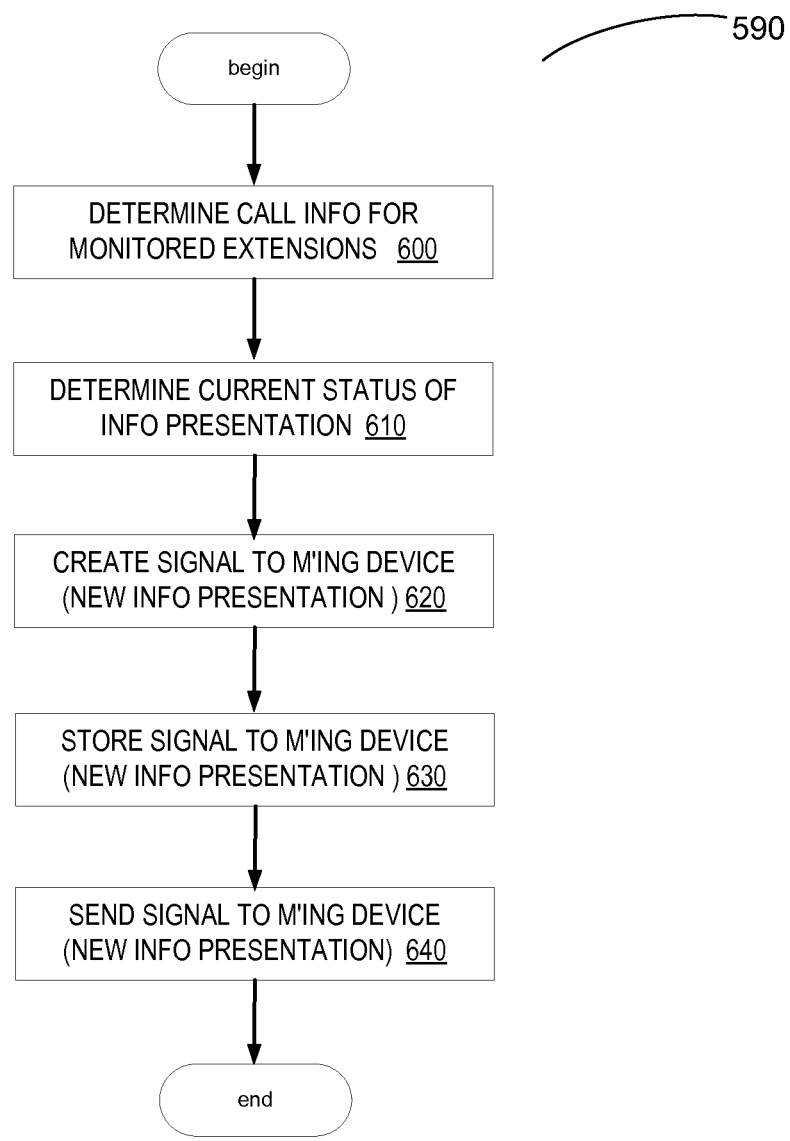
FIG. 6 illustrates a flowchart of a method performed by a server for enabling a user to navigate between several call offerings, according to one embodiment of the present invention.

EM control module 300 instructs monitoring device interface module 350 to wait 575 for a signal from a monitoring device. If a navigation signal is received 580, then method 500 proceeds to step 590, which is illustrated in FIG. 6. When a user navigates between offering calls (e.g., by activating a scroll key), a navigation signal is sent from the user's monitoring device to server 110. FIG. 6 illustrates a flowchart of a method performed by a server for enabling a user to navigate between several call offerings, according to one embodiment of the present invention.

EM control module 300 uses TAPI unit 240 to determine 600 information regarding calls offering on monitored extensions. In one embodiment, this information includes the destination party's name and extension number and the calling party's name and extension number. EM control module 300 determines 610 the current status of the monitoring device regarding what information is being presented. In order to do this, EM control module 300 queries storage interface module 360.

EM control module 300 uses presentation module 320 to create 620 a signal to send to the monitoring device. In one embodiment, this signal is based on information regarding calls offering on monitored extensions, the current status of the monitoring device, and the action signal that was received.

EM control module 300 uses storage interface module 360 to store 630 these signals in storage device 140. EM control module 300 uses monitoring device interface module 350 to send 640 these signals to the monitoring device. In one embodiment, these signals cause the monitoring device to present to the user information regarding a different call to the monitored extension.

Figure 7:
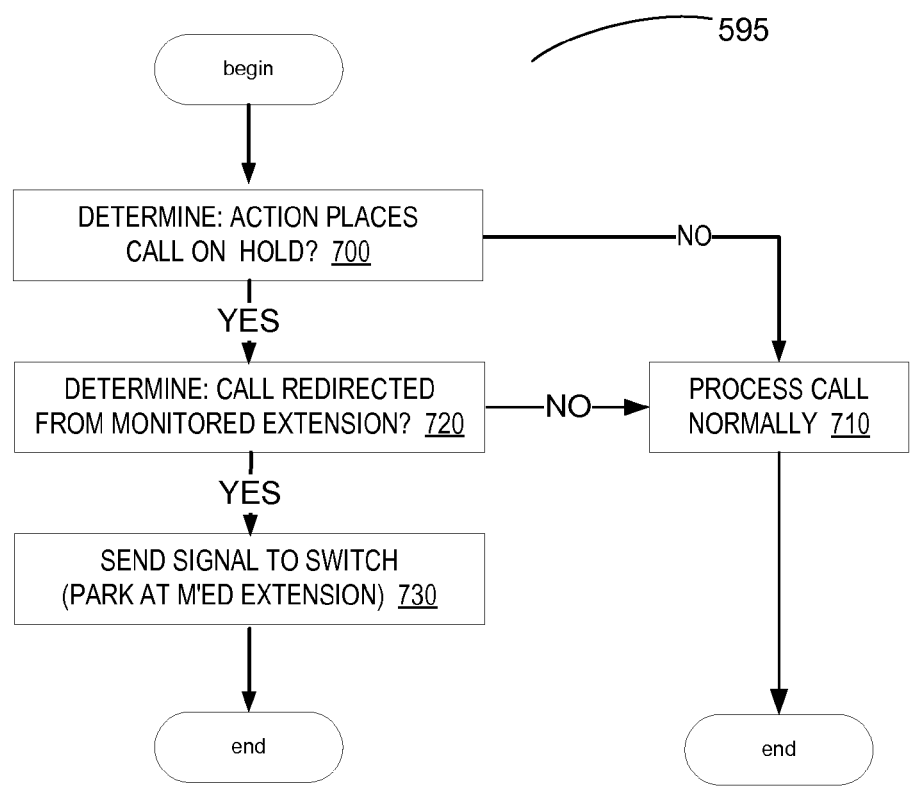
FIG. 7 illustrates a flowchart of a method performed by a server for enabling a user to park a call on a monitored extension, according to one embodiment of the present invention.

If an action signal is received 585, then method 500 proceeds to step 595, which is illustrated in FIG. 7. When a user performs a function on a call (e.g., by activating a function key 910), an action signal is sent from the user's monitoring device to server 110. FIG. 7 illustrates a flowchart of a method performed by a server for enabling a user to park a call on a monitored extension, according to one embodiment of the present invention.

EM control module 300 uses TAPI unit 240 to determine 700 whether the received action signal would normally place a currently connected call on hold (either directly or as a side effect of another action). If the action signal would not normally place a currently connected call on hold, the call is processed 710 normally (e.g., by executing the requested action), and method 595 ends. If the action signal would normally place a currently connected call on hold, EM control module 300 uses TAPI unit 240 to determine 720 whether the currently-connected call was redirected from a monitored extension. If the call was not redirected from a monitored extension, the call is processed 710 normally (e.g., by executing the requested action), and method 595 ends.

If the call was redirected from a monitored extension, EM control module 300 sends 730 a signal to the switch 130 that manages calls on the monitoring user's extension. This signal causes the switch 130 to park the call to the monitored extension. ("Parking" a call means placing a call on hold on another extension.) A parked call can be answered by either the monitored extension or the monitoring device. If the monitoring device answers the call, the call is transferred back to the monitoring user's extension.

Having described embodiments of a server with extension monitoring capability for a distributed telephony systems (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method comprising:
associating, using one or more processors, a first Internet Protocol (IP) phone that is associated with a first extension with a second extension;
signaling, using one or more processors, the first IP phone to display information about a call offering directed to the second extension;
selecting, using one or more processors, the displayed call offering directed to the second extension using the first IP phone associated with the first extension;
signaling, using one or more processors, the first IP phone to display a plurality of actions executable on the selected call offering;
receiving a selection of one of the plurality of actions executable on the selected call offering; and
executing the selected one of the plurality of actions on the selected call offering.

2. The method of claim 1, wherein the second extension is associated with a second IP phone, and the first IP phone is a desktop IP phone.

3. The method of claim 1 wherein executing the selected one of the plurality of action includes placing a call on hold; and
responsive to determining that the call was redirected from the second extension, signaling a switch to park the call at the second extension, wherein the parked call is answered by a second IP phone associated with the second extension or by the first IP phone associated with the second extension to monitor the second extension.

4. The method of claim 1, wherein the information displayed comprises a status of the second extension.

5. The method of claim 1, wherein information displayed comprises a status of the second extension including whether the second extension is idle.

6. The method of claim 1, wherein information displayed comprises a status of the second extension including whether the second extension is in do-not-disturb (DND) mode.

7. The method of claim 1, wherein information displayed comprises a status of the second extension including whether the second extension has an unheard message.

8. The method of claim 1, wherein information displayed comprises a status of the second extension including whether the second extension has an active conference call with a party other than the first extension.

9. The method of claim 1, wherein information displayed comprises a status of the second extension including whether the second extension has a held call.

10. The method of claim 1, wherein information displayed comprises a status of the second extension including whether the second extension has a held or parked call with a party other than the first extension.

11. The method of claim 1, wherein information displayed comprises a status of the second extension including whether the second extension has a connected call.

12. The method of claim 1, wherein information displayed comprises a status of the second extension including whether the second extension has an offering call.

13. The method of claim 1, wherein information displayed comprises a status of the second extension including whether the second extension has both a connected call and an offering call.

14. The method of claim 1, wherein a call is offering on the second extension and information regarding the second extension comprises information regarding a calling party of the call.

15. The method of claim 14, wherein information regarding a calling party of the call comprises one from a group of a name of the calling party and a phone number of a calling party.

16. The method of claim 1, wherein information regarding the second extension comprises one from a group of a name of a person associated with the second extension and a number associated with the second extension.

17. The method of claim 1, wherein one of the plurality of the actions executable is an action that a user navigates between a plurality of call offerings.

18. The method of claim 1, wherein the first IP phone comprises a soft key associated with the second extension and a portion of a display on the first IP phone is associated with the soft key and displays a number of the second extension.

19. The method of claim 18, wherein the portion of the display on the first IP phone further displays a status of the second extension.

20. The method of claim 1, wherein the first IP phone comprises a soft key, and a first portion of a display on the first IP phone associated with the soft key automatically displays a number of the second extension and a second portion of the display is configured to display the information about the call offering directed to the second extension.

21. The method of claim 1, wherein the first IP phone displays an indicator when more information than the information about the call offering displayed is available for display.

22. The method of claim 1, further comprising:
associating the first IP phone with a third extension; and
signaling the first IP phone to display information regarding the third extension.

23. The method of claim 22, wherein the information regarding the third extension includes information about a call offering directed to the third extension, the first IP phone simultaneously displaying information about the call offering directed to the second extension and the call offering directed to the third extension.

24. The method of claim 22, wherein the information regarding the third extension includes information about a call offering directed to the third extension, the first IP phone displays information about one extension at a time, and wherein one of the plurality of the actions executable is an action that a user navigates between a plurality of extensions to be displayed the call offering directed to the second extension and the call offering directed to the third extension.

25. The method of claim 22, wherein the information regarding the third extension includes information about a call offering directed to the third extension, the first IP phone displaying information about a call offering directed to the first extension, the call offering directed to the second extension and the call offering directed to the third extension.

26. An apparatus comprising:
one or more processors;
a presentation module executable by the one or more processors to generate a signal that causes a first Internet Protocol (IP) phone to display information including a call offering directed to a second extension and a plurality of actions executable on the call offering directed to the second extension;
a monitoring device interface module executable by the one or more processors to send data to and receive data from the first IP phone, wherein the data received from the first IP phone that is associated with the first extension includes a selection of the displayed call offering directed to the second extension;
a control module communicatively coupled to the presentation module and the monitoring device interface module; and
a park module configured to park a call at the second extension, wherein the parked call is answered by the second extension or the monitoring device, and wherein the control module is further communicatively coupled to the park module.

27. The apparatus of claim 26, further comprising:
an association module configured to determine whether the second extension is being monitored by the first IP phone, wherein the control module is further communicatively coupled to the association module.

28. The apparatus of claim 26, wherein information displayed comprises a status of the second extension including whether the second extension has a held or parked call with a party other than the first extension.

29. An apparatus comprising:
one or more processors;
a presentation module executable by the one or more processors to generate a signal that causes a first Internet Protocol (IP) phone to display information including a call offering directed to a second extension and a plurality of actions executable on the call offering directed to the second extension;
a monitoring device interface module executable by the one or more processors to send data to and receive data from the first IP phone, wherein the data received from the first IP phone that is associated with the first extension includes a selection of the displayed call offering directed to the second extension, wherein the selected call offering is an unconnected call;

a control module communicatively coupled to the presentation module and the monitoring device interface module; and an association module configured to determine whether the second extension is being monitored by the first IP phone, wherein the control module is further communicatively coupled to the association module.

30. The apparatus of claim 29, wherein information displayed comprises a status of the second extension including whether the second extension has a held or parked call with a party other than the first extension.

\* \* \* \* \*